Figure 1:
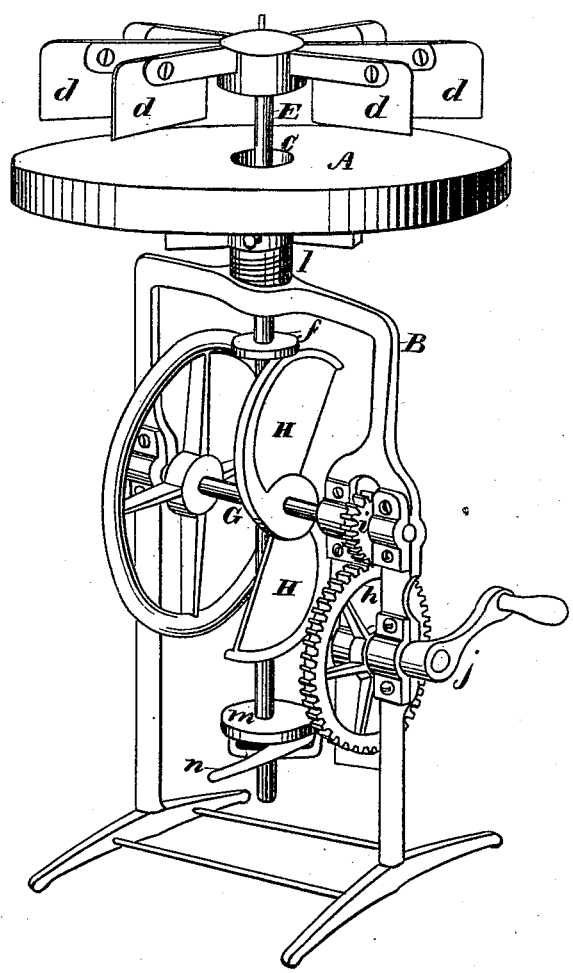

N. A. OLSSON.
MEAT-CHOPPER.

No. 180,261. Patented July 25, 1876.

Witnesses
Geo. H. Strong
Jno. L. Bone

Inventor
Nils A. Olsson
by Dewey & Co.
Attys.

UNITED STATES PATENT OFFICE.

NILS A. OLSSON, OF SAN FRANCISCO, CALIFORNIA.

IMPROVEMENT IN MEAT-CHOPPERS.

Specification forming part of Letters Patent No. 180,261, dated July 25, 1876; application filed April 15, 1876.

*To all whom it may concern:*

Be it known that I, NILS A. OLSSON, of San Francisco city and county, State of California, have invented an Improved Chopping-Machine; and I do hereby declare the following description and accompanying drawings are sufficient to enable any person skilled in the art or science to which it most nearly appertains to make and use my said invention or improvement without further invention or experiment.

My invention relates to an improved machine for chopping meats, vegetables, and other substances into fine pieces; and it consists of a series of radial knives, which are secured to the upper end of a spindle or stem. This stem passes down through a hole in the center of the chopping-block, and is operated by a cam and tappet below the block, by which the knives are given the proper chopping action.

Referring to the accompanying drawings, Figure 1 is a perspective view of my device.

Let A represent a chopping-block, which can be provided with sides, if desired. This block I mount upon a strong frame, B, and in its center I make a hole, C. The knives $d\ d$ (as many as desired) are secured radially to the upper end of the stem or spindle E, and this stem passes down through the hole C in the center of the block, so that the knives will rest upon the upper face of the block.

The arms to which the knives are bolted may be cast into a hub at the top of the spindle, and the cutters are adjustably secured to the arms by bolts, as shown.

On the stem E, below the block, I secure a tappet, $f$. A shaft, G, passes across the frame B, just below the tappet, transversely to the spindle E, and on this shaft I secure a double cam, H, which will strike the tappet when the shaft G is revolved, and lift the spindle, with its knives, vertically.

As soon as the tappet drops from the end of the cam, the stem and knives drop until the knives strike the upper surface of the block. The shaft G is driven by means of the gears $h\ i$ and crank $j$. The curved faces of the cam, moving against the under face of the tappet, will also partially rotate the spindle and knives during each lift, so that the knives are continually shifted, and thus drop in a different spot each time, thus giving the best possible effect of chopping-knives.

In order to adjust the length of the stroke or drop of the knives, I attach the block A to the top of the frame B, upon a screw, $l$, so that the block can be raised or lowered by turning it upon the screw, thus adjusting the length of drop, or, rather, lift, according to the amount of meat or other substance upon the block.

The lower end of the stem or spindle E passes through a hole in a block or arm, $m$, below the cam-shaft, by means of which it is guided. A lever or plate, $n$, is hinged to the under side of this block or plate, so that when the stem is raised to its highest point the plate or lever can be moved under its lower end, and thus support it above the block, in order to permit the substance to be placed upon or removed from the block.

I thus provide an extremely simple and effective chopping-machine.

The force of the drop can be regulated as desired by weighting the lower end of the spindle. The knives are lifted and dropped vertically, and at the same time are shifted after each stroke, thus rendering them quite effective in their action.

Having thus described my invention, what I claim, and desire to secure by Letters Patent, is—

1. In combination with the adjustable block A, having the hole C in its center, and mounted upon the frame B, the vertical stem or spindle E, with its radial chopping-knives $d\ d$, operated by the cam H and tappet $f$, substantially as and for the purpose described.

2. In combination with stem or spindle E, with its radial knives $d\ d$, operated by the cam H and tappet $f$, the guide-block $m$ and hinged plate or arm $n$, by means of which the stem can be supported at its highest position, substantially as and for the purpose described.

NILS A. OLSSON.

Witnesses:
GEO. H. STRONG,
JNO. L. BOONE.